United States Patent Office 3,375,242
Patented Mar. 26, 1968

3,375,242
CONVERSION OF NARINGIN TO NEOHESPERIDIN
AND NEOHESPERIDIN DIHYDROCHALCONE
Robert M. Horowitz, Pasadena, and Bruno Gentili, Glendale, Calif., assignors to the United States of America as represented by the Secretary of Agriculture
No Drawing. Filed Dec. 9, 1966, Ser. No. 600,067
4 Claims. (Cl. 260—210)

ABSTRACT OF THE DISCLOSURE

Naringin is reacted with isovanillin to produce neohesperidin chalcone. This chalcone may be cyclized to yield neohesperidin or it may be hydrogenated to yield neohesperidin dihydrochalcone, a compound which is intensely sweet and known to be useful for sweetening foods.

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its prime objects the provision of novel processes for converting naringin into neohesperidin dihydrochalcone. Another object of the invention is the provision of novel processes for converting naringin into neohesperidin. Further objects of the invention will be evident from the following description wherein parts and percentages are by weight unless otherwise specified.

In our Patent 3,087,821, issued Apr. 30, 1963, we have shown that certain dihydrochalcones exhibit intense sweetness and are useful for sweetening foods of all kinds. We have also shown that of these compounds, neohesperidin dihydrochalcone is outstanding in sweetness, being on a molar basis about 20 times sweeter than saccharin.

Our patent also discloses that neohesperidin dihydrochalcone can be synthesized from the flavanone glycoside, neohesperidin. However, commercial utilization of this synthesis has been impeded because of the high price of neohesperidin and its relative scarcity as compared with other naturally-occuring flavanone glycosides.

We have now found that neohesperidin dihydrochalcone can be prepared from naringin. Naringin is a flavanone glycoside which occurs naturally in grapefruit and is a by-product of the commercial processing of such fruit. It is abundantly available, relatively low in price, and to date has had few or no commercial uses. Thus, the present invention is not only valuable as a means of making available a useful sweetening agent but also as a means of utilizing a by-product of the grapefruit processing industry.

In a practice of the process of the invention, the following steps are applied:

(A) The starting compound, naringin, is converted into neohesperidin chalcone. This step is carried out by reacting naringin in hot aqueous alkali with an excess of isovanillin.

(B) The intermediate — neohespiridin chalcone — is then converted into the corresponding dihydrochalcone by conventional hydrogenation. Thus, for example, the chalcone is contacted with hydrogen gas in the presence of a hydrogenation catalyst such as finely divided platinum, palladium, or Raney nickel. It is not necessary to isolate the intermediate prior to hydrogenation. Thus, the reaction mixture obtained in Step A may be directly subjected to the hydrogenation. In a preferred embodiment of the invention, the reaction mixture obtained in Step A is treated to remove most of the unreacted isovanillin and the remainder is subjected to the hydrogenation.

The chemical changes involved in the synthesis are demonstrated by the following formulas, wherein "Neo" stands for the neohesperidosyl radical:

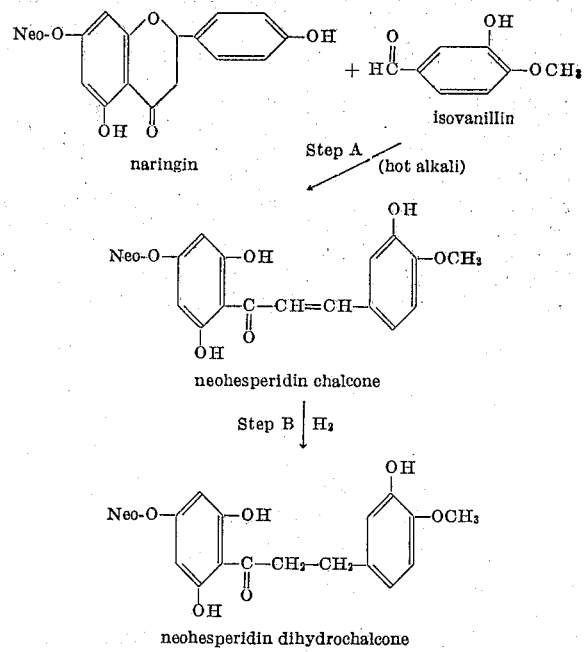

In a practice of Step A, a molar excess of isovanillin is employed to drive the reaction in the desired direction. Typically, at least two and preferably at least twelve moles of isovanillin are employed per mole of naringin. The reaction is carried out in hot aqueous alkali. Thus, for example, the reactants—naringin and isovanillin—are contacted with one another in an aqueous solution containing about 10 to 25% of NaOH or KOH, at a temperature from about 50 to 100° C.

After application of the hydrogenation (Step B) the product—neohesperidin dihydrochalcone—may be separated from the reaction system by applying conventional separation techniques capable of taking advantage of the fact that the product is relatively soluble in water while by-products are relatively insoluble in water but soluble in conventional organic solvents.

The invention is further demonstrated by the following illustrative example:

EXAMPLE I (A) A mixture of naringin (5 g.), isovanillin (15 g.), and 20% aqueous potassium hydroxide (100 ml.) was heated on a steam bath for 4.5 hours.

(B) The reaction mixture from Step A, containing the intermediate neohesperidin chalcone, was diluted with water (0 ml.), placed in an ice bath, acidified with concentrated aqueous hydrochloride acid, and then removed from the ice bath. The separated oil, consisting largely of excess isovanillin, crystallized rapidly. This was filtered out immediately and was washed with water, which was added to the filtrate. Sufficient aqueous 4 N sodium hydroxide was added to neutralize the filtrate, which had a final volume of 180 ml. An additional 18 g. of solid potassium hydroxide was then dissolved in the filtrate. After keeping this at room temperature for about 30 minutes, 1 gram of 10% palladium-carbon hydrogenation catalyst was added and the mixture hydrogenated at room temperature and 2 atmospheres pressure. The product was filtered, placed in an ice-bath and acidified with concentrated aqueous hydrochloric acid. It was then diluted to 300 ml. with water and extracted with ether (10×30 ml.) and ethyl acetate (4×30 ml.) to remove by-products. The crystals separating during the ethyl acetate extraction were retained in the aqueous layer, which was neutralized and evaporated to dryness under vacuum at 60° C. The residue was then extracted with boiling methanol (5×50 ml.). The combined extracts were concentrated, filtered from inorganic salts and taken to dryness under vacuum at 60° C. The residue was extracted with boiling acetone (2×35 ml.), which, when concentrated to a small volume, yielded crystals of neohesperidin dihydrochalcone (2.2 g.). This was recrystallized once for acetone to give 1.6 g. of neohesperidin dihydrochalcone, M.P. 156°–158° C., identical in all respects with a known sample.

Another embodiment of the invention is concerned with the synthesis of neohesperidin. This compound is prepared by applying Step A as above described and then adding acid to the reaction system to bring the pH to 7 or less. This causes cyclization of the intermediate to produce neohesperidin, as shown in the formulas below. The acidified mixture may be warmed—for example, to 50–100° C.—to promote the cyclization.

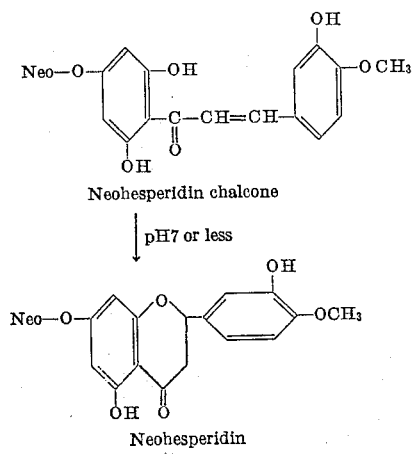

Neohesperidin chalcone

↓ pH7 or less

Neohesperidin

This aspect of the invention is further demonstrated by the following illustrative example:

EXAMPLE II (A) A mixture of naringin (5 g.), isovanillin (15 g.), and 20% aqueous KOH (200 ml.) was heated on the steam bath for 4.5 hours.

(B) The reaction mixture from Step A was cooled in an ice bath and enough glacial acetic acid was added to bring the pH to about 7. The mixture was allowed to stand and after one hour the crystalline deposit (10 g.), consisting briefly of unreacted isovanillin, was removed by filtration. The filtrate was warmed on the steam bath for 30 minutes to complete the cyclization of neohesperidin chalcone to neohesperidin. Upon cooling, the solution was made strongly acidic with hydrochloric acid. It was extracted with a small volume of ether to remove the remaining isovanillin and was then reduced in volume to 150 ml. by vacuum evaporation at room temperature in a rotary evaporator. Inorganic salts were filtered out and the filtrate extracted with five 75-ml. portions of ethyl acetate. The combined ethyl acetate extracts as well as the residual aqueous layer shortly began depositing crystals of neohesperidin. The combine crops totalled 1.32 g. of pure neohesperidin, M.P. 244–246° C., after recrystallization from aqueous ethanol. The infrared and nuclear magnetic resonance spectra of the product were indistinguishable from those of natural neohesperidin.

Having thus described the invention, what is claimed is:

1. A process for preparing neohesperidin dihydrochalcone which consists of:
    (A) reacting naringin with an excess of isovanillin in hot aqueous alkali solution to produce neohesperidin chalcone, and
    (B) hydrogenating the neohesperidin chalcone to produce neohesperidin dihydrochalcone.

2. A process for preparing neohesperidin dihydrochalcone which consists of:
    (A) reacting naringin with an excess of isovanillin in hot aqueous alkali solution to produce neohesperidin chalcone, and
    (B) subjecting the resulting reaction mixture containing neohesperidin chalcone to hydrogenation to produce neohesperidin dihydrochalcone.

3. A process for preparing neohesperidine chalcone which consists of heating, at about 50–100° C., a reaction mixture of naringin and a molar excess of isovanillin in aqueous alkali.

4. A process for preparing neohesperidin which consists of:
    (a) reacting naringin with an excess of isovanillin in hot aqueous alkali solution to produce neohesperidin chalcone, and
    (B) adding acid to the reaction mixture containing neohesperidin chalcone to produce neohesperidin.

References Cited

UNITED STATES PATENTS 2,926,162   2/1960   Hart _____ 260—210
3,087,821   4/1963   Horowitz et al. _____ 260—210

LEWIS GOTTS, Primary Examiner.

J. R. BROWN, Assistant Examiner.

UNITED STATES PATENT OFFICE
CERTIFICATE OF CORRECTION

Patent No. 3,375,242                      March 26, 1968

Robert M. Horowitz et al.

It is certified that error appears in the above identified patent and that said Letters Patent are hereby corrected as shown below:

Column 1, line 60, for "neohespiridin" read -- neohesperidin --; column 2, line 55, for "(0 ml.)" read -- (60 ml.) --; line 56, for "hydrochloride" read -- hydrochloric --; column 3, line 9, for "for" read -- from --; line 51, for "briefly" read -- chiefly --; column 4, line 11, for "combine" read -- combined --; line 32, for "neohesperidine" read -- neohesperidin --.

Signed and sealed this 22nd day of July 1969.

(SEAL)
Attest:

Edward M. Fletcher, Jr.                      WILLIAM E. SCHUYLER, JR.
Attesting Officer                              Commissioner of Patents